United States Patent [19]

Zimmer et al.

[11] Patent Number: 5,677,560

[45] Date of Patent: Oct. 14, 1997

[54] MICROMECHANICAL COMPONENT AND PROCESS FOR THE FABRICATION THEREOF

[75] Inventors: Günther Zimmer, Duisburg; Wilfried Mokwa, Krefeld, both of Germany

[73] Assignee: Fraunhofer Gesellschaft zur Forderung der Angewandten Forschung e.V., Munich, Germany

[21] Appl. No.: 429,576

[22] Filed: Apr. 27, 1995

Related U.S. Application Data

[63] Continuation of Ser. No. 952,833, Jan. 22, 1993, abandoned.

[30] Foreign Application Priority Data

May 29, 1990 [DE] Germany .................... 40 17 265.1

[51] Int. Cl.⁶ ........................................... H01L 29/82
[52] U.S. Cl. .................... 257/418; 257/415; 257/417; 257/419; 437/62; 437/901
[58] Field of Search ............................ 257/415, 416, 257/417, 418, 419, 420; 437/62, 901

[56] References Cited

U.S. PATENT DOCUMENTS

| | | |
|---|---|---|
| 4,463,336 | 7/1984 | Black et al. . |
| 4,524,247 | 6/1985 | Lindenberger et al. . |
| 4,665,610 | 5/1987 | Barth ............................ 29/580 |
| 4,721,938 | 1/1988 | Stevenson ...................... 338/4 |
| 4,744,863 | 5/1988 | Guckel et al. ................. 156/653 |
| 5,006,487 | 4/1991 | Stokes ........................... 437/228 |
| 5,080,730 | 1/1992 | Wittkower . |
| 5,095,349 | 3/1992 | Fujii et al. . |
| 5,196,355 | 3/1993 | Wittkower ..................... 437/24 |
| 5,310,689 | 5/1994 | Tomozane et al. ............ 437/24 |

OTHER PUBLICATIONS

Benjamin, "Micromachining of Silicon by Selective Anodisation", Dec. 1986, pp. 23 to 43.

*Primary Examiner*—Ngân V. Ngô
*Attorney, Agent, or Firm*—Antonelli, Terry, Stout & Kraus, LLP.

[57] ABSTRACT

A micromechanical component having a carrier and a deformable element of a flat design disposed parallel to a surface of the carrier, with the deformable element being provided with a mechano-electric signal converter. The carrier and the deformable element are fabricated in one piece out of a semiconductor substrate and are electrically insulated from one another, with the insulation being obtained by a buried layer produced by ion implantation thereby providing a micromechanical component which is suitable for joint integration with electric circuits in CMOS technology.

26 Claims, 6 Drawing Sheets

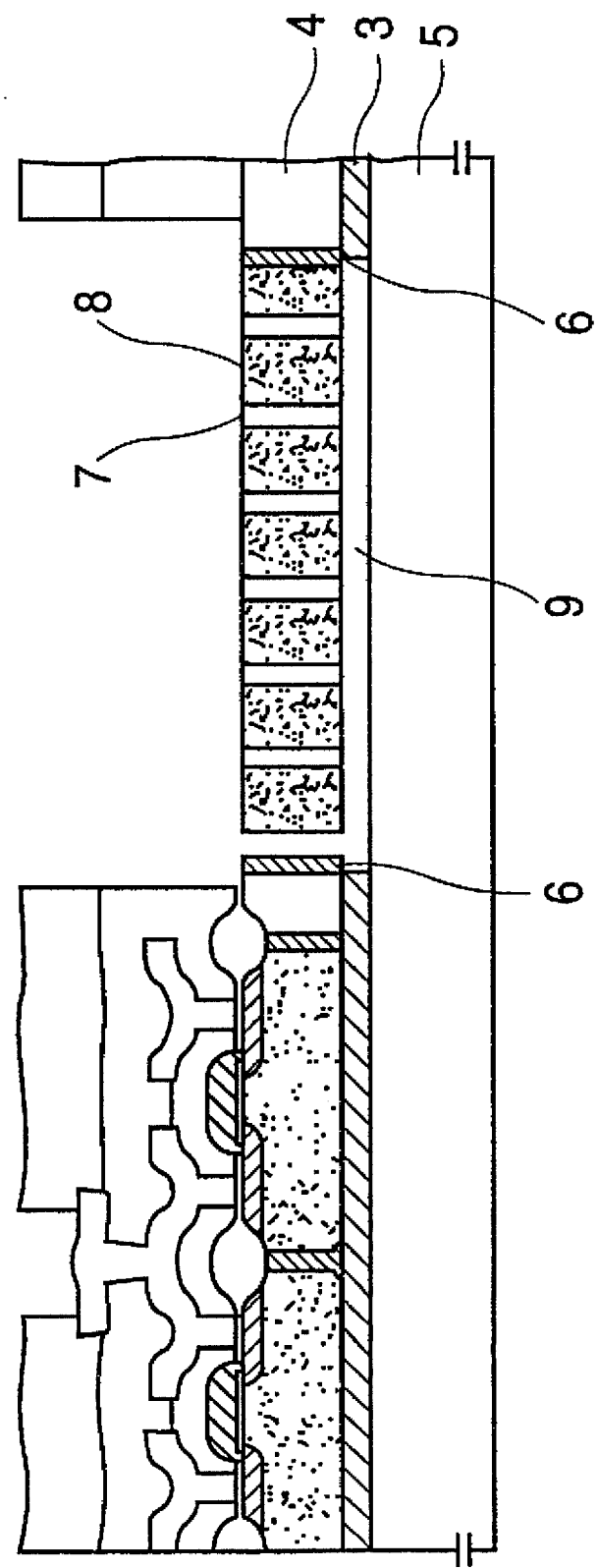

5,677,560

MICROMECHANICAL COMPONENT AND PROCESS FOR THE FABRICATION THEREOF

This application is a Continuation of application Ser. No. 07/952,833, filed Jan. 22, 1993 abandoned.

TECHNICAL FIELD

The present invention relates to a micromechanical component having a carrier and a deformable element of flat design disposed parallel to the surface of the carrier, the element being provided with a mechano-electric signal converter as well as to a process for the fabrication thereof.

With a component of this type it is possible to realize various sensors and actuators, serving, by way of illustration, to convert into electric signals ambient values such as pressure, temperature or gas concentrations but also such values as acceleration or flow of media. As actuators, components of this kind can be utilized as switches or valves.

A generic component and process for the fabrication thereof is known from the U.S. Pat. No. 4,744 863. This component is a pressure sensor having a membrane, which can be fabricated using planar technology. A spacing layer of silicon dioxide is placed on a silicon wafer. The membrane material, a layer of polysilicon or silicon nitride, is precipitated thereon. Etching channels leading down to the spacing layer are formed by means of precipitation and subsequent etching away of narrow silicon dioxide bands.

The material of the spacing layer under the membrane is etched away through these channels, whereby a hollow space is produced between the membrane and the substrate. The etching channels are closed afterwards.

Further components are known from DE 39 18 769 and U.S. Pat. No. 4,670,969.

An ultra thin membrane and a process for its fabrication are described in the scientific publication by C. J. Schmidt, P. V. Lenzo and E. G. Spencer, "Preparation of Thin Windows in Silicon Masks for X-ray Lithography", Journal of Applied Physics, Vol. 46, 1975, pp. 4080–4082. The membrane is produced at the front side of the substrate by etching away the substrate material from the rear side of the wafer. This is done by means of respective masking of the wafer on the front and rear side. In order to stop the etching process upon reaching the desired thickness of the membrane, the wafer is strongly doped in a thin layer in the membrane region. This doped layer acts as an etching stop.

In the prior art components, the deformable element is shaped by the acting value to be measured, the degree of shaping is converted into an electric signal, for example, by piezoresistive resistances disposed on the component or by capacitive signal conversion.

Due to the very low level it is desirable to amplify the signals directly on the semiconductor substrate in the immediate proximity of the deformable element. A time-proven technology for signal processing widely used in microelectronics is CMOS technology.

The prior art micromechanical components are, however, unsuited for joint integration kith CMOS circuits. The membrane of polysilicon, respectively strongly doped silicon is not electrically insulated from the substrate material and therefore conductively connected to the CMOS circuit. Furthermore, the membrane and the substrate are made of different materials, respectively of materials of greatly differing doping, making system integration difficult.

A membrane of polysilicon which is electrically insulated from the substrate material is described in the applicant's unpublished patent application P 40 04 179.9. The insulation is obtained by placing an insulating layer on a semiconductor substrate prior to placing a polycrystalline semiconductor layer which forms the membrane.

SUMMARY OF THE INVENTION

The object of the present invention is to provide a micromechanical component which is suited for mutual integration with MOS circuits as well as to a process for the fabrication thereof.

This object is solved in the case of a generic component by the carrier and the deformable element, which extends parallel to the surface of the carrier and is arranged opposite thereto, are fabricated in one piece out of a semiconductor substrate and can be insulated electrically from one another.

In accordance with the present invention, a process for the fabrication of a micromechanical component having a carrier and deformable element of a flat design disposed opposite and parallel to the surface of the carrier proceeding from a monocrystalline semiconductor substrate includes the steps of producing a buried insulation layer in a semiconductor body or substrate which serves as an etching stop or which is at least partially etched away during fabrication. The buried layer is produced of local ion implantation out of an insulating compound in a prescribed space below the surface of the semiconductor substrate. The monocrystalline semiconductor layer remaining over the layer is cured or healed by a heating process with etching channels being etched out of the semiconductor covering layer at prescribed points. The buried layer is etched away in regions determined by the choice of the etching channels and the length of the etching period with the aid of a selectively acting etching medium.

In the micromechanical component of the present invention, a carrier and deformable element are provided, with the deformable element being of a flat construction disposed opposite and parallel to the surface of the carrier. The element is provided with a mechano-electric signal converter with the carrier and the deformable element being fabricated in one piece out of a semiconductor substrate, with the carrier and the deformable element being insulated from one another. The semiconductor substrate is a silicon wafer.

By virtue of the last noted features of the present invention, it is ensured that a buried insulating layer is produced in a prescribed space between it and the surface of the substrate. The buried layer may, for example, be produced by creating an insulating layer, for example, an oxide layer, in the surface of a first substrate and by joining the first substrate with a second substrate by a bonding process as described hereinabove.

The deformable element is formed by a partial or complete removal of the buried layer with the carrier and the deformable element being made of the same material which also has the same doping. As the deformable element thus has the same electrical properties as the substrate, it is suited without modification for the integration of silicon circuits thereby substantially simplifying the system integration.

In accordance with further features of the present invention, the mechano-electric signal converter is constructed as a plate capacitor having variable plate spacing, with an electrode of the capacitor being formed by the deformable element and a counter electrode by a region of the carrier lying opposite the deformable element.

By virtue of the last noted features of the present invention, the mechano-electric signal conversion occurs with the aid of a capacitor having a variable capacity due to a variable space between the plate, with the capacity being dependent upon the deformation of the deformable element. The plate capacitor is compatible with the CMOS circuit elements and therefore suited for system integration.

Advantageously, according to the present invention, the counter electrode is electrically insulated from the carrier and from the deformable element thereby excluding the influence of the electric relationships in the semiconductor substrate on the measurement of the capacity, the region of the carrier forming the counter electrode electrically insulated from the substrate.

The deformable element may be constructed as a membrane; however, signal conversion is also possible with the aid of a piezoresistive resistance. The piezoresistive resistance can, for example, be produced by local doping in the deformable element, with only the counter electrode being insulated from the carrier and the deformable element.

The measuring range of the component depends substantially on the mass of the deformable element. On the basis of the depth in which the buried layer begins beneath the surface, the thickness of the deformable element and, therefore, its mass can be determined. For example, with the layer disposed on the deformable element, the mass may be increased by depositing a layer, for example, made of a monocrystalline silicon by means of epitaxy, made of polysilicon or metal. As in the case of epitaxy, the layer grows in a crystalline manner with the deformable elements remaining monocrystalline in its overall thickness in this reinforcement.

Advantageously, the deformable element is fashioned as a membrane and is therefore suited for measuring pressure, in particular, sonic pressure or impact pressure. If a monocrystalline Si wafer is utilized as the carrier, the membrane is also monocrystalline.

Advantageously, the membrane and the carrier envelope a hermetically sealed hollow space which is evacuated or contains a prescribed amount of gas thereby improving the measurement of hydrostatic pressures.

The deformable element of the micromechanical component may be fashioned as a bar whereby, for example, the changes in the angle position are measured.

Moreover, the deformable element may be fashioned as a one-sided cantilever tongue thereby enabling a measurement of linear accelerations, whereby any desired acceleration direction can be selectively determined.

The micromechanical component may be provided with several deformable elements with the several elements being arrayed in a row to, for example, increase the output signal. However, the elements may also be switched in such a manner that each measured value can be determined separately in order to obtain a spatial distribution of the measured values.

Additionally, in accordance with the present invention, the micromechanical component and the electronic circuit for evaluating the electric signals may be jointly integrated in a semiconductor wafer. In this manner, the highest degree of miniaturization is attained and several identical components can be produced simultaneously on the wafer thereby reducing the fabrication costs.

In accordance with the process of the present invention for fabricating a micromechanical component having a carrier and a deformable element of a flat design disposed opposite and parallel to the surface of the carrier proceeding from a monocrystalline semiconductor substrate, in the semiconductor substrate, a buried insulation layer is produced which serves as an etching stop or which is at least partially etched away during fabrication.

Additionally, by means of local ion implantation, a buried layer is produced out of an insulating compound in a prescribed space below the surface of the semiconductor substrate and, by a heating process, the monocrystalline semiconductor layer remaining over the layer is healed or cured. Etching channels are etched out of the semiconductor covering layer at prescribed points, with the buried layer being etched away in regions determined by the choice of the etching channels and the length of the etching period with the aid of selectively acting etching medium.

According to the present invention, prior to etching the etching channels, a groove surrounding the area of the deformable element is defined by a photolithography and, in a region of the groove, the semiconductor covering layer and the buried layer lying beneath the semiconductor covering layer are etched away with the resulting groove being filled with a material which is resistant to the selectively acting etching medium.

According to the invention, the buried layer is only produced in a local region, with the wafer surface being covered by masking outside this region and the surface layer of the semiconductor substrate is electrically insulated from the carrier outside the deformable element by ion implantation, with the local region of the deformable element being masked.

Electric insulation of the deformable element from the carrier may, in accordance with the present invention occur by local oxidation of the surface layer in a region which envelopes the deformable element, with the configuration of the deformable element being defined by photolithography.

The buried layer may be produced by implantation of oxygen ions and may be composed of silicon dioxide or may be produced by the implantation of nitrogen ions and be composed of silicon nitride.

Advantageously, in a semiconductor substrate of a first conductivity, prior to local implantation to produce the buried layer, a trough-shaped area of a second conductivity counter to the first conductivity is produced, which is at least partially divided by the buried layer into two regions which run parallel to the surface.

The essential advantages of the present invention are, in particular, that the micromechanical components are especially well suited for the system integration of micromechanical and micro-electric components, thereby raising the degree of miniaturization, simplifying production and increasing the reliability of the component. Furthermore, the invented process also succeeds in reducing the size of deformation of the deformable element, thereby enhancing measurement sensitivity. Whereas previously ultra thin monocrystalline silicon membranes having a minimum thickness of approximately 1.5 µm have become known, invented membranes having a thickness of merely 0.2 µm can be fabricated.

In comparison to the known fabrication processes in which the deformable element is formed by means of rear side etching, consequently etching occurs throughout the entire semiconductor, the surface of the deformable element can be substantially reduced with the invented process.

The invented micromechanical components are suited, by way of illustration, for use in medicine, sound measurement technology, hydraulics, robotics, land and air traffic and in space travel.

BRIEF DESCRIPTION OF THE DRAWING

Preferred embodiments of the present invention are illustrated in the accompanying drawings wherein:

FIGS. 7a–7d are schematic illustrations of perspective views of further embodiments of the component in accordance with the present invention, respectively.

DESCRIPTION OF EMBODIMENTS

Figure 1:
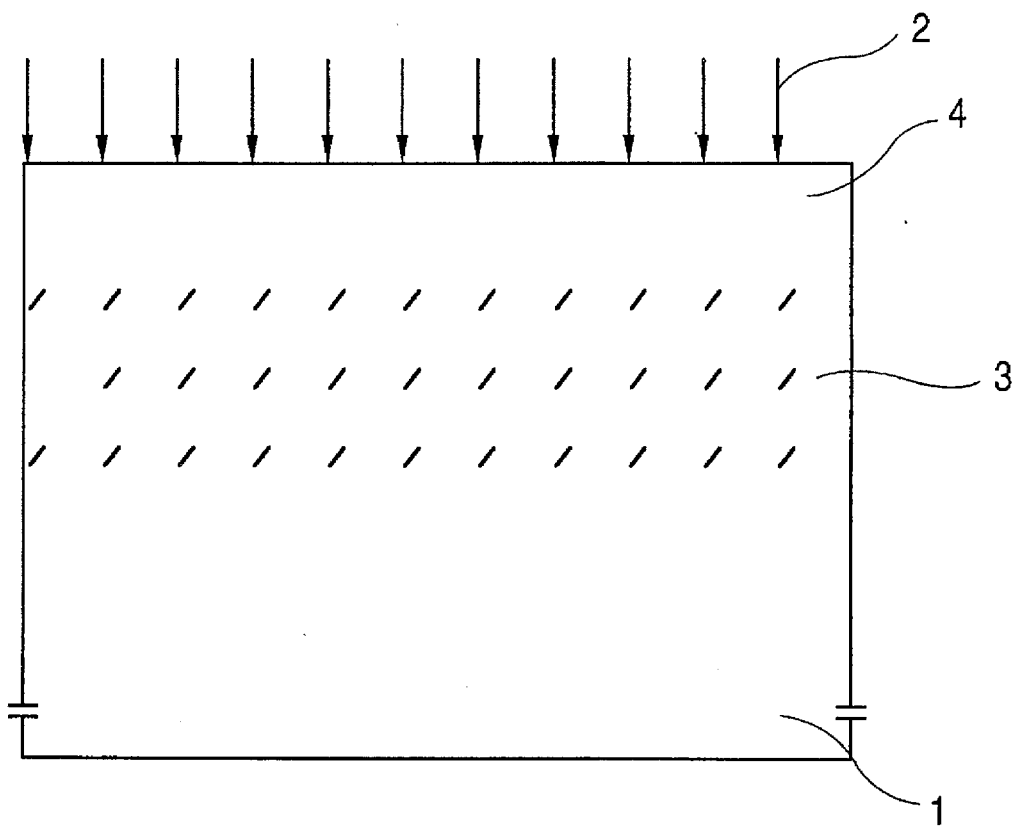
FIG. 1 is a schematic view of an implantation of a buried layer.

In order to fabricate a component constructed in accordance with the present invention, ions, as shown in FIG. 1, are implanted in a semiconductor substrate, with the ion beam being represented by the arrows 2. The energy distribution of the ions is selected in such a manner that the ions penetrate into the substrate to a prescribed depth and cause chemical reactions in a layer 3 of the substrate 1. By this means an insulating, buried layer 3 is created inside the substrate 1. When oxygen ions are implanted, a silicon dioxide layer is created. Likewise, nitrogen ions can be implanted, thereby forming a silicon nitride layer.

Figure 2:
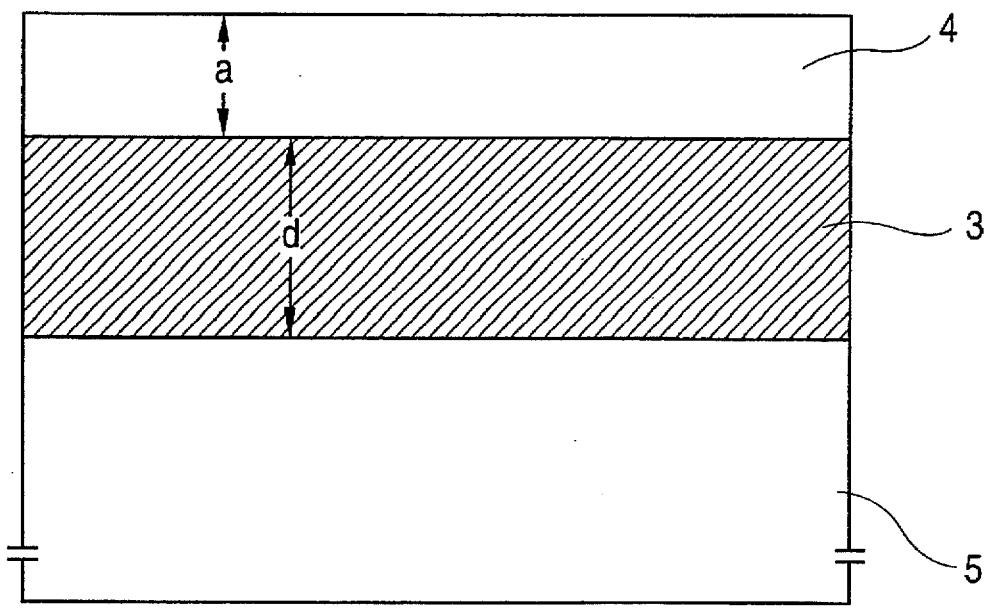
FIG. 2 is a schematic representation of a semiconductor substrate with a buried layer.

The reaction of the implanted ions with the silicon occurs during a heating procedure and damage to the covering layer occurring during the implantation is cured. As shown in FIG. 2, the insulating, buried layer 3 divides the semiconductor substrate 1 into the covering layer 4 from which the deformable element is formed and the carrier 5. The space a between the burried layer 3 and the substrate surface determines the thickness of the covering layer 4 and therefore the thickness of the deformable element. The thickness d of the buried layer determines the space between the deformable element and the carrier 5.

The buried layer 3 may, for example, have a space a of 0.2 μm between it and the substrate surface so that a deformable element with a thickness of only 0.2 μm is created. A typical value for the space between the element and the carrier 5 is 0.4 μm. However, with the process of the present invention, greater thicknesses can be obtained.

Figure 3:
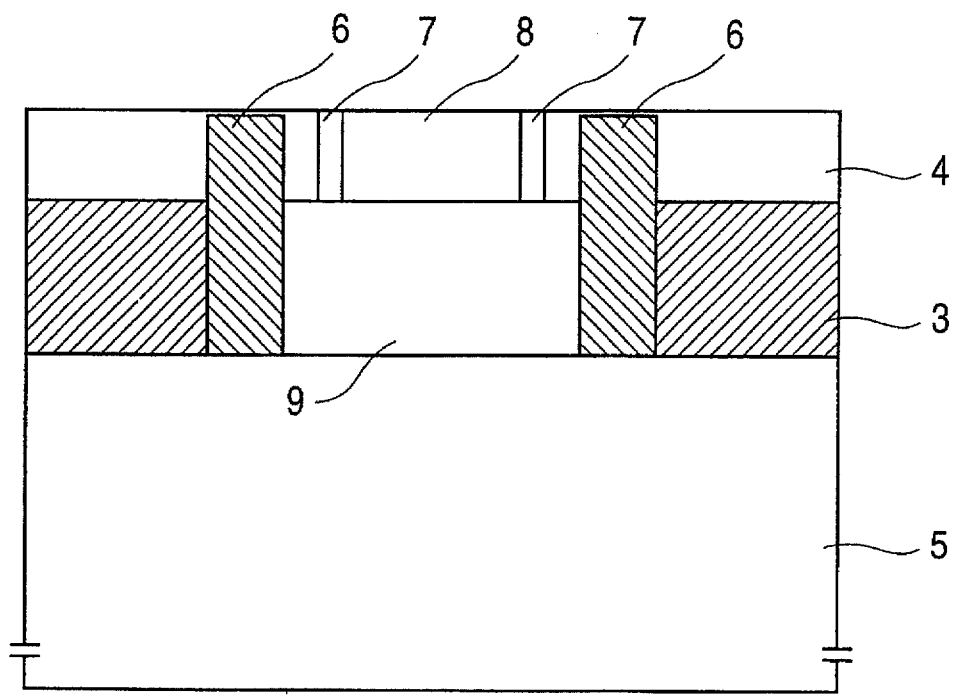
FIG. 3 is a cross-sectional view of a component constructed in accordance with the present invention.

FIG. 3 shows a membrane as an embodiment of an invented component. For its production, a groove 6 surrounding the future membrane region 8 is defined. In the subsequent etching process, the semiconductor material of the covering layer and the material of the buried layer in the region of the groove is removed. The thus created groove 6 is filled with a material which is resistant to the etching medium with which the buried layer 3 is removed in the region of the membrane 8 in a subsequent step. Polysilicon may, by way of illustration, be used as the filling material. The groove 6 filled in this manner serves a lateral etching stop.

With the aid of standard etching processes etching channels 7 through which the etching medium can act on the material of the buried layer 3 in the region of the membrane 8 are produced in the covering layer 4 in the region of the membrane 8. A hollow space 9 is created between the membrane 8 and the carrier 5 by the etching process. In order to hermetically seal this hollow space 9, the etching channels are sealed, by way of illustration, by precipitating silicon dioxide or a metal.

Figure 4:
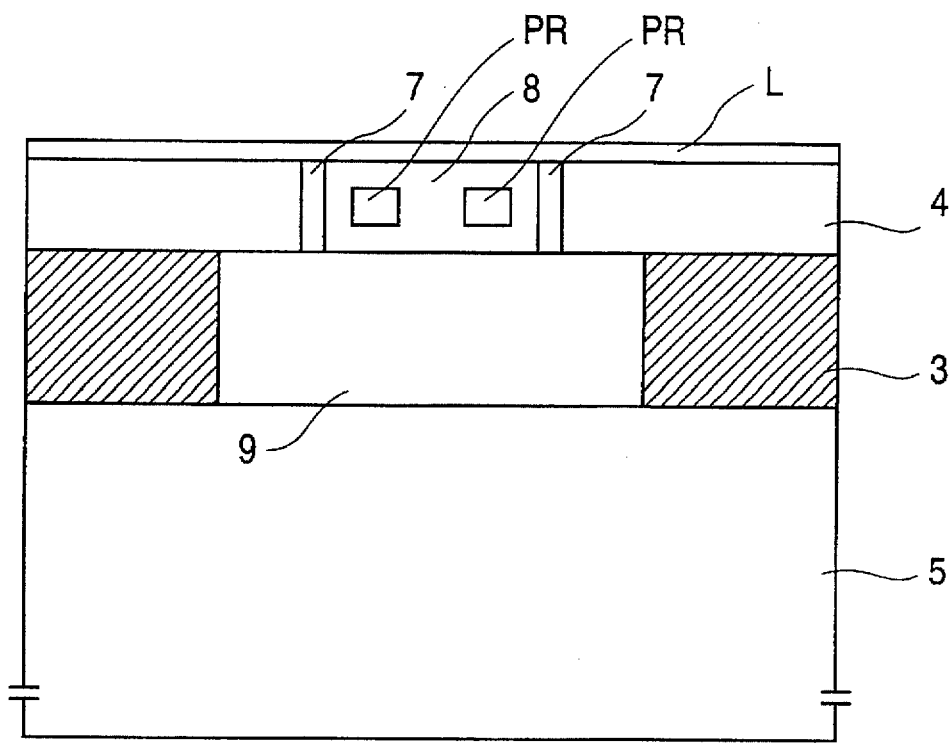
FIG. 4 is a cross-sectional view of another embodiment of the component of the present invention.

In the embodiment shown in FIG. 4, building a filled groove as a lateral etching stop is obviated. The size of the membrane region 8 is defined in this case by the selection of a specific etching period. In both the described embodiments, the covering layer 4 is electrically isolated over the entire crosssection of the substrate from the carrier 5 by the buried layer 3, thereby resulting in the event of a joint integration of electric circuits of the same semiconductor body all the advantages of a "silicon on insulator technology" (SOI) such as radiation resistance, lach-up insensitivity and temperature insensitivity.

The measuring range of the component depends substantially on the mass of the deformable elements. On the basis of the depth in which the buried layer begins beneath the surface, the thickness of the deformable element and, therefore, its mass, can be determined. For example, by depositing a layer L, such as shown in FIG. 4, which is made of monocrystalline silicon by means of epitaxy, made of polysilicon or metal, the mass of the deformable elements can be increased. As in the case of epitaxy, the layer grows in a crystalline manner with the deformable elements remaining monocrystalline in its overall thickness in this reenforcement.

Figure 5A:
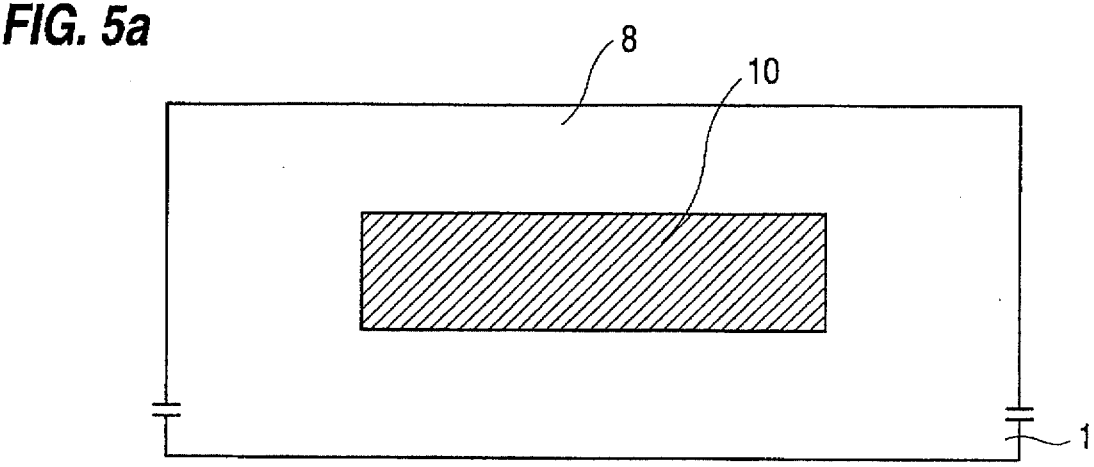
FIG. 5a is a schematic view of a substrate with a partially implanted buried layer.
Figure 5B:
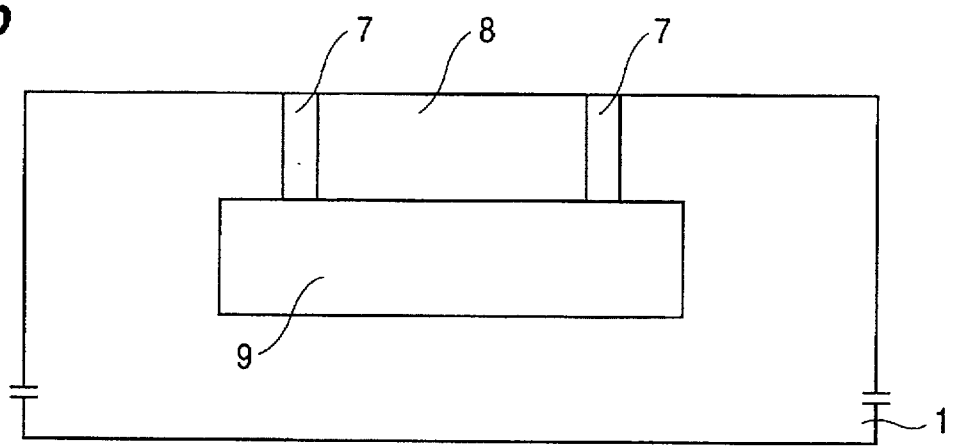
FIG. 5b is a schematic cross sectional view of another component constructed in accordance with the present invention.

In a further embodiment, as FIGS. 5a and 5b show, the ion implantation is only carried out in a local region 10, which simultaneously defines the region of the membrane 8. The remaining region of the semiconductor substrate 1 is covered by suitable masking. The etching channels 7 are produced in the region of the membrane 8 and the material of the buried layer 10 is etched out. In this manner a process is provided to etch a buried hollow area 9 in a semiconductor substrate 1.

The remaining surface layer of the semiconductor substrate outside the membrane region 8 may be electrically insulated from the substrate 11 by subsequent implanation of nitrogen or oxygen.

Figure 5C:
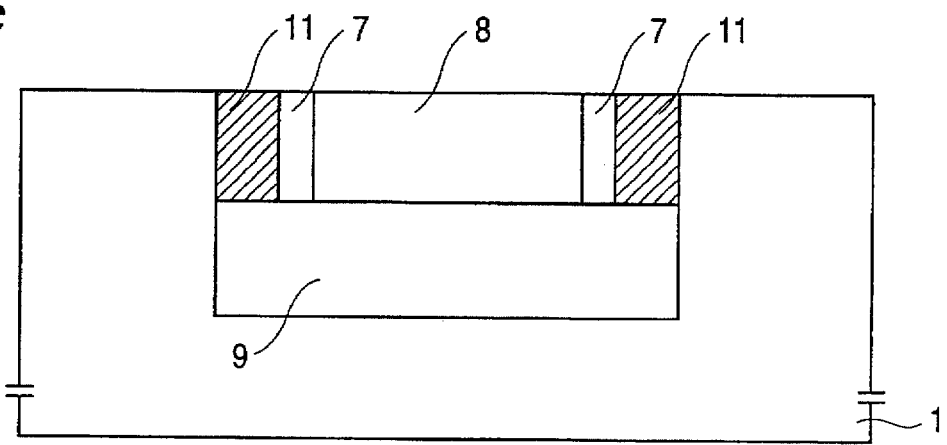
FIG. 5c is a schematic view of yet another embodiment of a component constructed in accordance with the present invention.

In a preferred embodiment, shown in FIG. 5c, the electrical insulation of the membrane from the carrier is by local oxidation of a region 11 of the surface layer enclosing the membrane. This embodiment is distinguished by an especially high degree of efficiency.

Figure 6A:
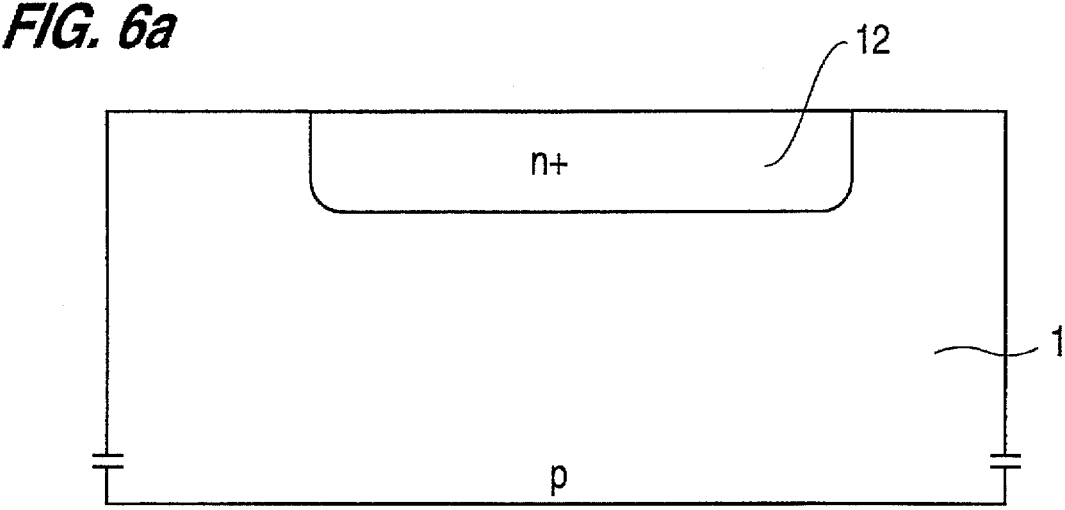
FIGS. 6a–6c are schematic views of a fabrication of a component constructed in accordance with the present invention.
Figure 6B:
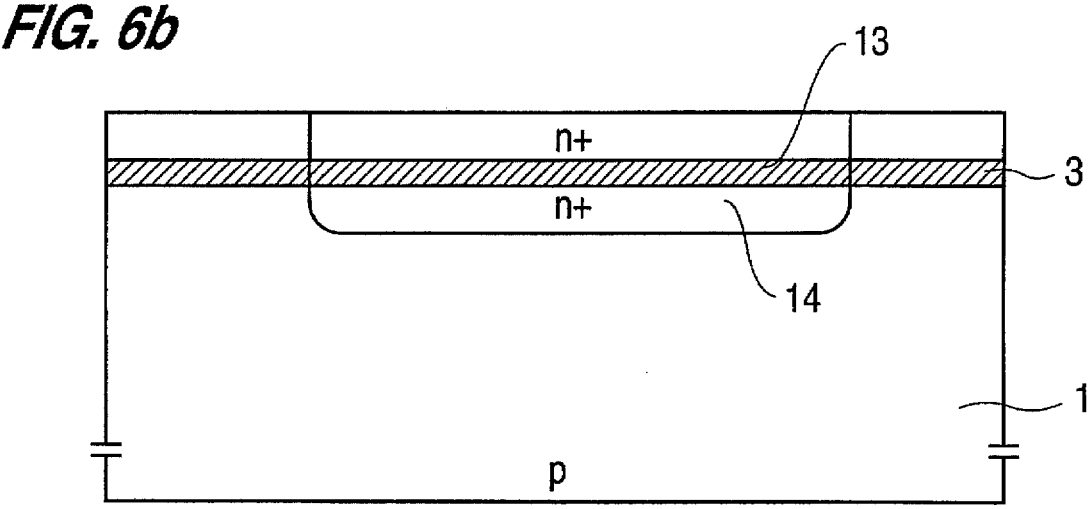
Figure 6C:
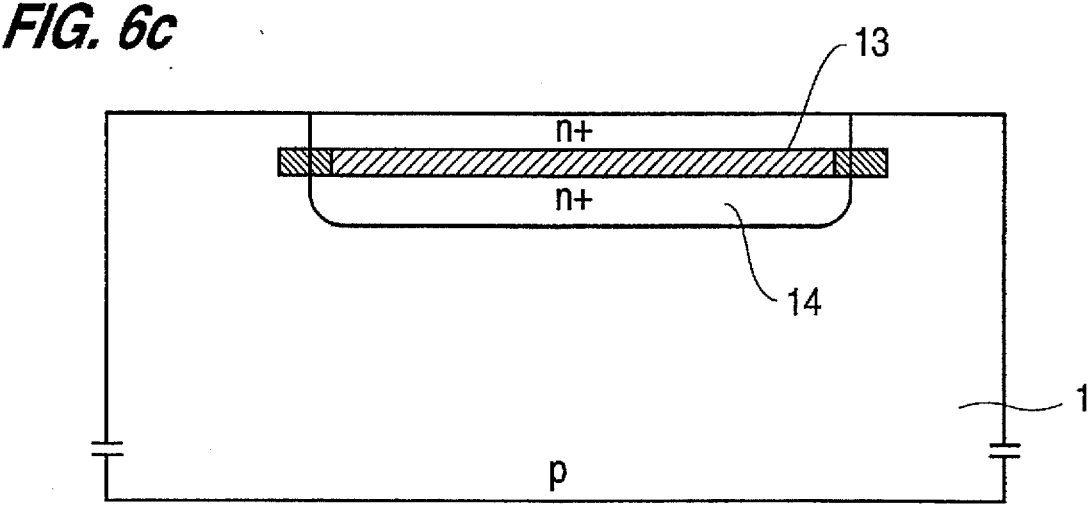

A further development of the invented process is shown in FIGS. 6a to 6c. A trough-shaped $n^+$ doped area 12 is formed in a semiconductor substrate 1, which, by way of illustration, is p-doped in design. The depth of the trough is selected in such a manner that buried layer 3 represented by means of the implantation divides the trough into an upper region 13 and a lower region 14. This further development of the process is particularly advantageous if the measurement of the deformation of the deformable element occur capacitatively. The lower region 14 acting as a counter electrode can be insulated by means of a suited potential at the pn transition from the semiconductor substrate.

The trough technique can, as shown in FIG. 6b, be combined with a whole surface implanatation or according to FIG. 6c with a partial implantation.

If two electrically insulated regions 13 and 14 are advantageous for an application, the partial integration is carried out in such a manner that the buried layer extends over the trough.

Due to the influence of a to-be-measured value, the deformable element, that is, the membrane 9 is deformed. The degree of the deformation may, by way of illustration, be capacitatively determined. As the membrane 9 is electrically insulated from the carrier 5, the change in the capacity of the capacitor formed by the membrane 9 and the region of the carrier 5 opposite the 9 can be measured. In the simplest case a suited contacting of the covering layer 4 and the carrier 5 will suffice. The degree of the deformation can also be determined by disposing piezoresistive resistances in the membrane.

Figure 7A:
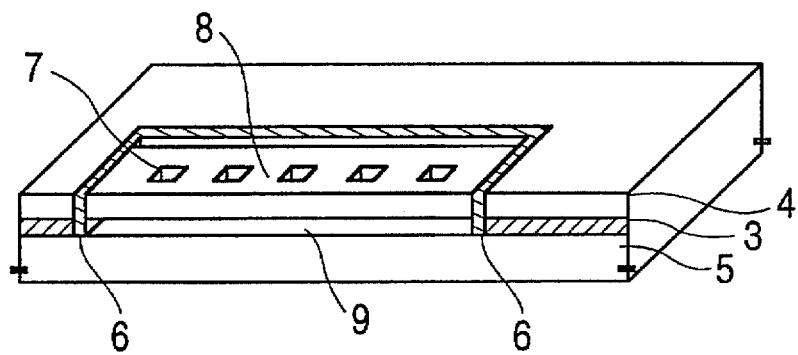
Figure 7B:
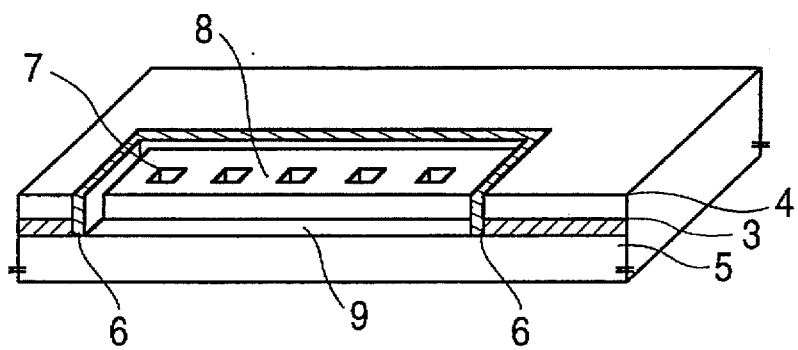
Figure 7C:
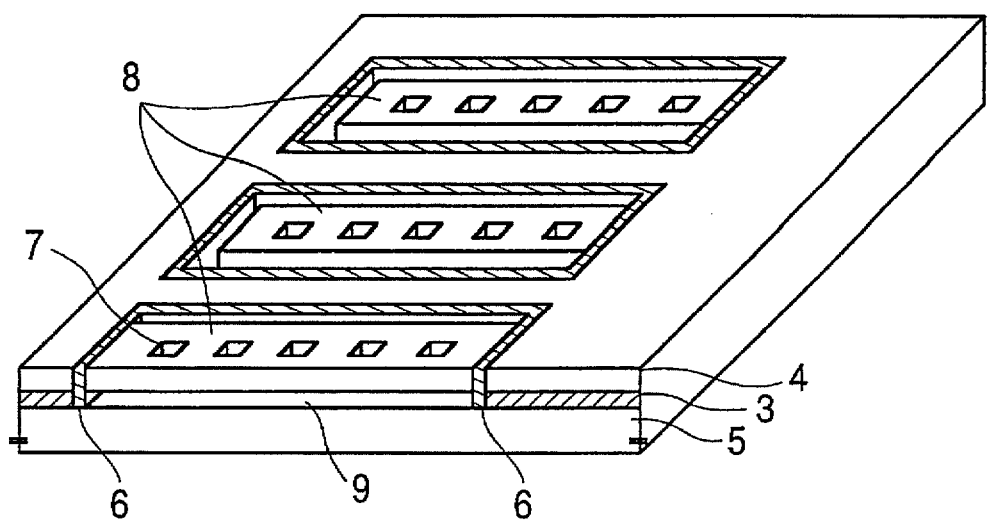

FIGS. 7a–7d are schematic illustrations of embodiments of the micromechanical component in which FIG. 7a specifically fashions the deformable element 8 as a membrane and which figures also are illustrative of fashioning the deformable element as a bar, a one-sided cantilever tongue, a scheme in which the micromechanical component is provided with a plurality of deformable elements and, additionally, showing at least one micromechanical component that is jointly fabricated with an electronic circuit in a semiconductor wafer, in which the electronic circuit can be inclusive of MOS (CMOS) circuit elements such as that shown in FIG. 7d.

What is claimed is:

1. A micromechanical component comprising a one piece semiconductor substrate of a carrier and a deformable element of a flat design disposed opposite and parallel to a surface of said carrier, said carrier and said deformable element being electrically insulated from one another within said one piece semiconductor substrate, and said deformable element being provided with a mechano-electric signal converter.

2. A micromechanical component according to claim 1, wherein said semiconductor substrate is a silicon wafer.

3. A micromechanical component according to claim 1, wherein said mechano-electric signal converter includes a plate capacitor having variable plate spacing, and wherein an electrode of said capacitor is formed by said deformable element and a counter electrode is formed by a region of said carrier lying opposite said deformable element.

4. A micromechanical component according to claim 3, wherein said counter electrode is electrically insulated from the remainder of said carrier and from said deformable element.

5. A micromechanical component according to claim 1, wherein said mechano-electric signal converter is formed by a piezoresistive resistance disposed on said deformable element.

6. A micromechanical component according to claim 1, wherein a layer is disposed on said deformable element.

7. A micromechanical component according to claim 1, wherein said deformable element is fashioned as a membrane.

8. A micromechanical component according to claim 7, wherein said membrane and said carrier envelope a hermetically sealed hollow space which is one of evacuated or contains a prescribed amount of gas.

9. A micromechanical component according to claim 1, wherein said deformable element is fashioned as a bar.

10. A micromechanical component according to claim 1, wherein said deformable element is fashioned as a one-sided cantilever tongue.

11. A micromechanical component according to claim 1, wherein said micromechanical component is provided with a plurality of deformable elements.

12. A micromechanical component according to claim 1, wherein at least one micromechanical component is jointly integrated with electronic circuits in a semiconductor wafer.

13. A micromechanical component according to claim 1, wherein said semiconductor substrate is a monocrystalline semiconductor substrate having a buried insulation layer which serves as an etching stop or which is at least partially etched away during fabrication of the micromechanical component.

14. A micromechanical component according to claim 1, wherein a buried insulation layer electrically insulates said carrier and said deformable element from one another.

15. A process for fabrication of a micromechanical component, comprising the steps of forming a one piece semiconductor substrate with a carrier and a deformable element of flat design disposed opposite and parallel to a surface of the carrier so that the carrier and the deformable element are electrically insulated from one another within the one piece semiconductor substrate.

16. A process according to claim 15, further comprising the step of providing the deformable element with a mechano-electric signal converter.

17. A process according to claim 15, further comprising the step of producing a buried insulation layer for electrically insulating the carrier and the deformable element from one another.

18. A process according to claim 17, wherein the substrate is a monocrystalline semiconductor substrate and further comprising the step of at least partially etching the buried insulating layer during fabrication.

19. A process according to claim 18, wherein the step of producing the buried insulation layer includes locally ion implanting the buried layer out of an insulating compound in a prescribed area below a surface of said semiconductor substrate, heating a monocrystalline semiconductor covering layer remaining over said buried layer to cure the same, etching out etching channels from the semiconductor covering layer at prescribed points, and wherein said buried layer is etched away in regions in dependence upon a disposition of said etching channels and a length of the etching period and in dependence upon an etching medium.

20. A process according to claim 19, wherein, prior to etching said etching channels, a groove surrounding the area of the deformable element is defined by photolithography, and, in a region of said groove, said semiconductor covering layer and said buried layer lying beneath said semiconductor covering layer are etched away, and wherein the groove is filled with a material which is resistant to said etching medium.

21. A process according to claim 19, wherein said buried layer is only produced in a local region, a surface of the semiconductor substrate is covered by masking outside said local region, and wherein said covering layer of said semiconductor substrate is electrically insulated from said carrier outside said deformable element by ion implantation, with said region of said deformable element being masked.

22. A process according to claim 21, wherein electric insulation of said deformable element from said carrier occurs by local oxidation of said surface layer of said semiconductor substrate in a region enveloping said deformable element.

23. A process according to claim 19, wherein a configuration of said deformable element is defined by photolithography.

24. A process according to claim 19, wherein said local implantation of said buried layer is produced by implantation of oxygen ions and is composed of silicon dioxide.

25. A process according to claim 19, wherein said local implantation of said buried layer is produced by implantation of nitrogen ions and is composed of silicon nitride.

26. A process according to claim 19, wherein the semiconductor substrate has a first conductivity and, prior to said local implantation to reduce said buried layer, a trough-shaped area of a second conductivity, opposite said first conductivity, is produced, which is at least partially divided by said buried layer into two regions extending parallel to the surface.

* * * * *